United States Patent [19]

O'Connell et al.

[11] Patent Number: 5,538,207
[45] Date of Patent: Jul. 23, 1996

[54] BOOM-MOUNTABLE ROBOTIC ARM

[75] Inventors: Daniel N. O'Connell; Clifford W. Devine, both of Oliver, Canada

[73] Assignee: Danford Technologies Inc., Oliver, Canada

[21] Appl. No.: 370,368

[22] Filed: Jan. 9, 1995

[30] Foreign Application Priority Data

Oct. 28, 1994 [CA] Canada ................................. 2134617

[51] Int. Cl.$^6$ ....................................................... F16L 3/00
[52] U.S. Cl. ................................................. 248/49; 182/2
[58] Field of Search ............................. 248/49, 58, 351, 248/544; 52/127.1, 127.2; 182/2

[56] References Cited

U.S. PATENT DOCUMENTS

| 1,501,590 | 7/1924 | Floyd . | |
|---|---|---|---|
| 2,502,815 | 4/1950 | Beebe | 254/139 |
| 3,204,309 | 9/1965 | Ricker | 24/81 |
| 3,271,009 | 9/1966 | Wright et al. | 254/134.3 |
| 3,381,711 | 5/1968 | Fye et al. | 137/615 |
| 3,540,111 | 11/1970 | Wainwright | 29/401 |
| 4,421,301 | 12/1983 | Chapman | 254/134.3 |
| 4,466,506 | 8/1984 | Dolenti | 182/2 |
| 4,721,213 | 1/1988 | Eitel | 182/2 X |
| 4,973,795 | 11/1990 | Sharpe | 174/40 |
| 5,056,673 | 10/1991 | Williams | 212/179 |

FOREIGN PATENT DOCUMENTS 1352827  5/1964  France .

197299  8/1989  Japan .

OTHER PUBLICATIONS

A.B. Change Company Catalog Bulletin 7B–13, Feb. 1980.
A.B. Change Company Supplemental Catalog Bulletin 7B–28.1 & 28.2, Oct., 1987.
Hastings Fiber Glass Products Inc. Product Catalog, 1985.

*Primary Examiner*—Ramon O. Ramirez
*Attorney, Agent, or Firm*—Oyen Wiggs Green & Mutala

[57] ABSTRACT

A telescoping robotic arm for temporarily supporting energized power lines to enable repair or replacement of transmission poles, crossarms, insulators and the like. The robotic arm is connectible to the boom of a service vehicle and is operable by remote control. The arm includes a boom adaptor sleeve for receiving the upper end of the boom, a frame pivotably coupled to the boom adaptor, and at least one telescoping arm coupled to the frame and adjustable between a retracted position and an extended position coaxial with the frame. An insulator stack and conductor holder are mounted on each of the telescoping arm(s) and the frame for releasably engaging a corresponding energized conductor. The angular position of the frame relative to the boom adaptor is adjustable to permit levelling of the robotic arm irrespective of the boom angle. In one embodiment of the invention, the robotic arm is capable of engaging and supporting both transmission lines supported at the upper end of a transmission tower or pole and distribution lines supported by a lower crossarm directly underneath the transmission lines.

35 Claims, 16 Drawing Sheets

BOOM-MOUNTABLE ROBOTIC ARM

FIELD OF THE INVENTION

This application relates to a robotic arm for temporarily supporting and repositioning energized power lines to enable repair or replacement of transmission or distribution poles, crossarms, insulators, insulator pins and the like, or to relocate conductors to facilitate their replacement. The invention is connectible to the boom of a service vehicle and includes telescoping arms operable by remote control.

BACKGROUND OF THE INVENTION

High voltage transmission and distribution lines are typically strung between a series of spaced-apart support towers or poles. The conductors are connected to insulators mounted on or suspended from crossarms extending at the upper end of transmission or distribution poles, or conductor support points built into transmission towers. Periodically it is necessary to replace or repair the poles or towers, crossarms and insulators to maintain the electrical circuit in good working order. It is preferable if this maintenance and repair work can be performed without de-energizing the conductors in order to avoid an interruption of service to consumers, or to avoid the necessity of purchasing power from an alternative source, or other system disruptions.

Hot line repair work is a potentially hazardous undertaking. Safety regulations require that linemen maintain a minimum work clearance or "limit of approach" from energized conductors. The limit of approach varies depending upon the voltage of the conductors in question.

Conventional procedures used by linemen to temporarily support energized conductors in order to enable repair of damaged or obsolete components involve the use of insulated wire tongs, lift poles and rope blocks in labour-intensive, complex rigging arrangements. Conventional fiberglass insulated tools are limited to use only in good weather. Any accumulation of moisture which may impair their insulating property requires that the job be stopped, and that the conductors be placed in an insulator which is rated for all-weather use.

Several auxiliary crossarms have also been proposed in the past for temporarily supporting conductors, thereby reducing the need for labour-intensive "stick work" by linemen. For example, U.S. Pat. No. 4,973,795, which issued to Sharpe on 27 Nov., 1990, relates to an auxiliary crossarm consisting of an insulated boom fitted with polymer insulators and conductor hooks for releasably engaging energized conductors. The Sharpe boom is suspended from a crane above the transmission lines to be serviced.

Auxiliary crossarms for temporarily lifting and supporting energized conductors from below are also well known. Such crossarms typically have sleeves which are connectible to the boom jibs of derrick or bucket trucks.

Utility companies often find it convenient to string both transmission lines and distribution lines on the same pole or tower. The distribution lines are usually suspended between four to twelve feet below the transmission lines. This makes it very difficult or impossible to safely raise prior art boom-mounted auxiliary crossarms to a position immediately beneath the transmission lines in order to provide temporary support to the lower-mounted distribution conductors. Further, the prior art does not disclose any auxiliary arms capable of simultaneously supporting and manipulating both upper transmission lines and lower distribution lines suspended on the same support poles (which is required in the case of pole changes).

Another limitation of prior art designs is that they do not permit pivotal movement of the auxiliary crossarm relative to the boom of a service vehicle. A limited range of pivotal movement is desirable to easily facilitate conductor capture, to enable insertion of the crossarm between upper and lower-mounted conductors and to allow for relocation of conductors to different final configurations (such as from triangular to flat spacing and vice versa). The capacity to control pivotal movement of the crossarm also helps to compensate for "bad parks" by the service vehicle and ensures that the arm can be made level irrespective of the boom angle.

A further limitation of prior art boom-mounted auxiliary arms is that all of the conductors move together as a unit as the truck boom or overhead crane is adjusted. That is, operators are not able to independently control the motion of each separate conductor in order to maximize lineman working clearances or to relocate the conductors to a different spacing configuration.

Accordingly, the need has arisen for a boom-mountable robotic arm for temporarily supporting energized conductors which enables linemen to maximize working clearances in a safe and time efficient manner.

SUMMARY OF THE INVENTION

In accordance with the invention a boom-mountable robotic arm is provided for temporarily supporting a conductor, such as an energized transmission line. The robotic arm includes a boom adapter connectible to the boom of a service vehicle; an upper frame pivotably connected to the boom adaptor; a first telescoping arm coupled to a first end of the upper frame and moveable relative to the frame between retracted and extended positions; a first insulator mounted on the first telescoping arm; a conductor holder mounted on the insulator for releasably coupling the robotic arm to the conductor; and adjustment means for adjusting the angular position of the upper frame relative to the boom adaptor.

The robotic arm also preferably includes actuating means for actuating movement of the first telescoping arm; and remote control means for remotely controlling operation of the actuating means. The actuating means may consist of a first hydraulic cylinder housed within the upper frame.

The adjustment means may consist of an extensible levelling arm extending between the upper frame and the boom adaptor. A hydraulic levelling cylinder may be provided for actuating movement of the levelling arm. Preferably the boom adaptor is connected to an end portion of the upper frame.

The robotic arm may also include a second telescoping arm coupled to a second end of the upper frame and moveable relative to the upper frame between retracted and extended positions. The first and second telescoping arms and the upper frame are preferably coaxial. The actuating means may further include a hydraulic cylinder housed within the upper frame for actuating movement of the second telescoping arm. An insulator and conductor holder is mounted on the second telescoping arm for releasably engaging and supporting a second conductor. A further insulator and conductor holder may be mounted directly on the upper frame for releasably engaging and supporting a third conductor. For example, the first, second and third conductors could comprise a three phase high voltage transmission line.

The robotic arm may also include a lower frame pivotally coupled to the boom adaptor and disposed beneath the upper frame. A third telescoping arm may be coupled to the lower frame for movement relative to the lower frame between retracted and extended positions. The lower frame is provided for engaging and supporting conductors disposed below the first, second and third conductors (such as distribution lines supported beneath high voltage transmission lines).

BRIEF DESCRIPTION OF THE DRAWINGS

In drawings which illustrate embodiments of the invention, but which should not be construed to limit the spirit or scope of the invention in any way.

DETAILED DESCRIPTION OF THE PREFERRED EMBODIMENT

Figure 1:
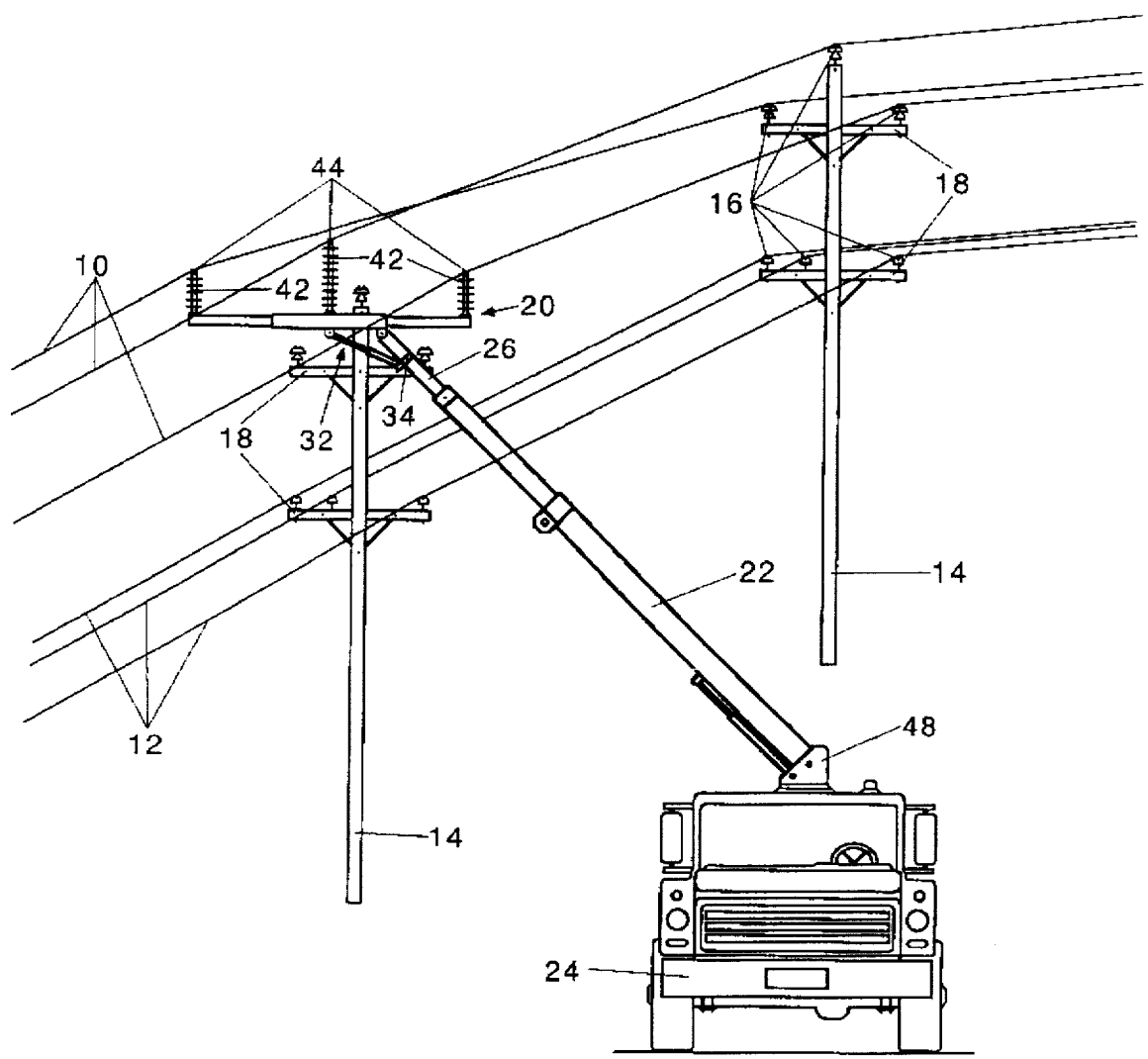
FIG. 1 is an isometric view of the applicant's robotic arm mounted on the boom of a service vehicle for temporarily supporting transmission and distribution conductors extending between transmission towers.

As shown in FIG. 1, transmission lines 10 and distribution lines 12 are typically strung between a series of spaced-apart support towers or poles 14. Lines 10 and 12 are connected to insulators 16 mounted on crossarms 18 extending at the upper end of towers 14.

In order to minimize electromagnetic effects, transmission lines 10 are often strung in a triangular formation with the centre conductor extending above the two outside conductors. Often both transmission and distribution phases are supported by the same support towers 14. In this case, the lower crossarm 18 supporting the distribution line conductors 12 is suspended approximately four to twelve feet below the upper crossarm 18 (FIG. 1).

In order to maintain electrical circuits in good working order, the support towers 14, insulators 16, and crossarms 18 must be periodically replaced or repaired. It is preferable if the necessary maintenance work can be completed without the need to de-energize the electrical circuit in question in order to avoid disruption to customers.

Figure 2:
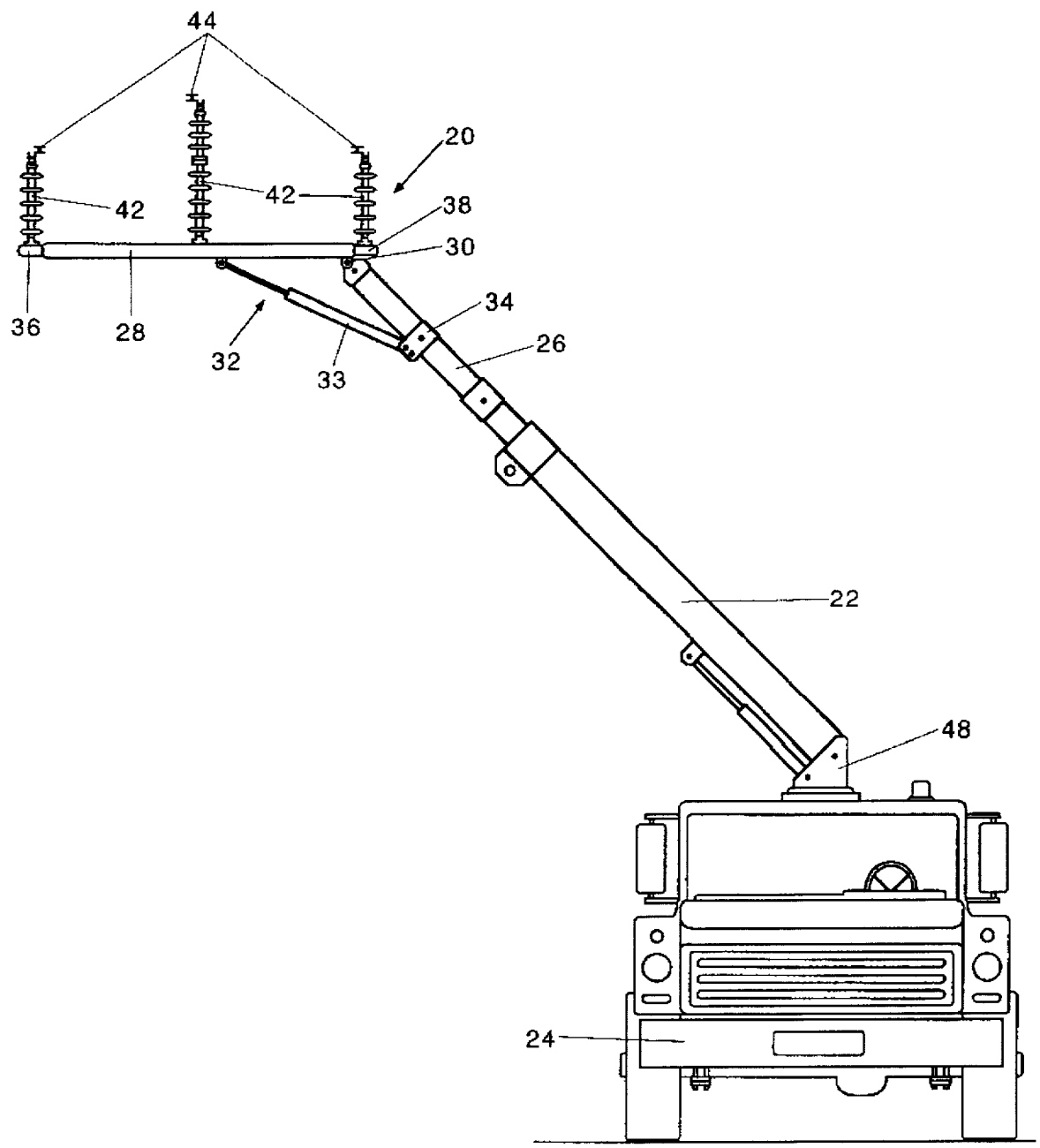
FIG. 2 is a side elevational view of the robotic arm and service vehicle of FIG. 1.

This application relates to a robotic arm 20 specially adapted for servicing energized electrical circuits. As shown in FIG. 2, robotic arm 20 is mountable on the boom 22 of a service vehicle 24 by means of a boom adaptor 26. Boom adaptor 26 preferably consists of an insulated sleeve, approximately five to six feet in length, which fits tightly over the upper end of boom 22 and is secured in place with a steel collar (not shown). The collar is held in place with a steel pin and locked with a keeper key.

Boom adaptor 26 also preferably includes an insulated fiberglass section to electrically isolate robotic arm 20 from the ground. This permits the use of non-insulated booms 22. As discussed further below, the entire robotic arm 20 may be shrouded by an insulating material in an alternative embodiment.

Figure 3:
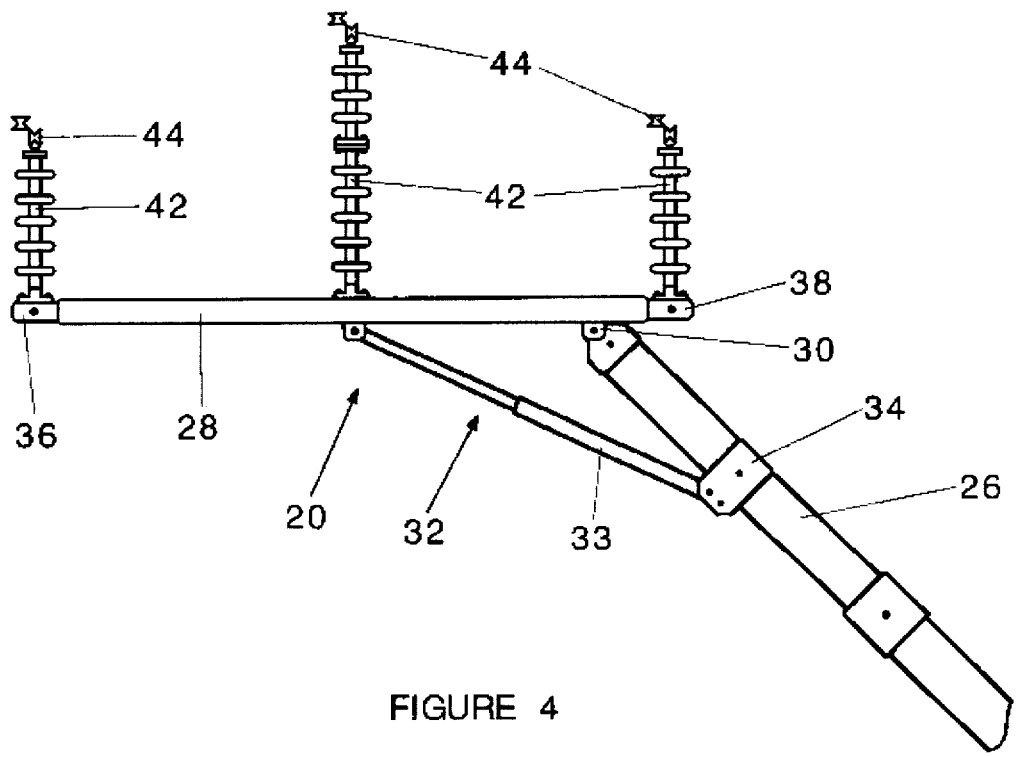
FIG. 3 is an enlarged, side elevational view of the robotic arm of FIG. 2 with the telescoping arms retracted.
Figure 4:
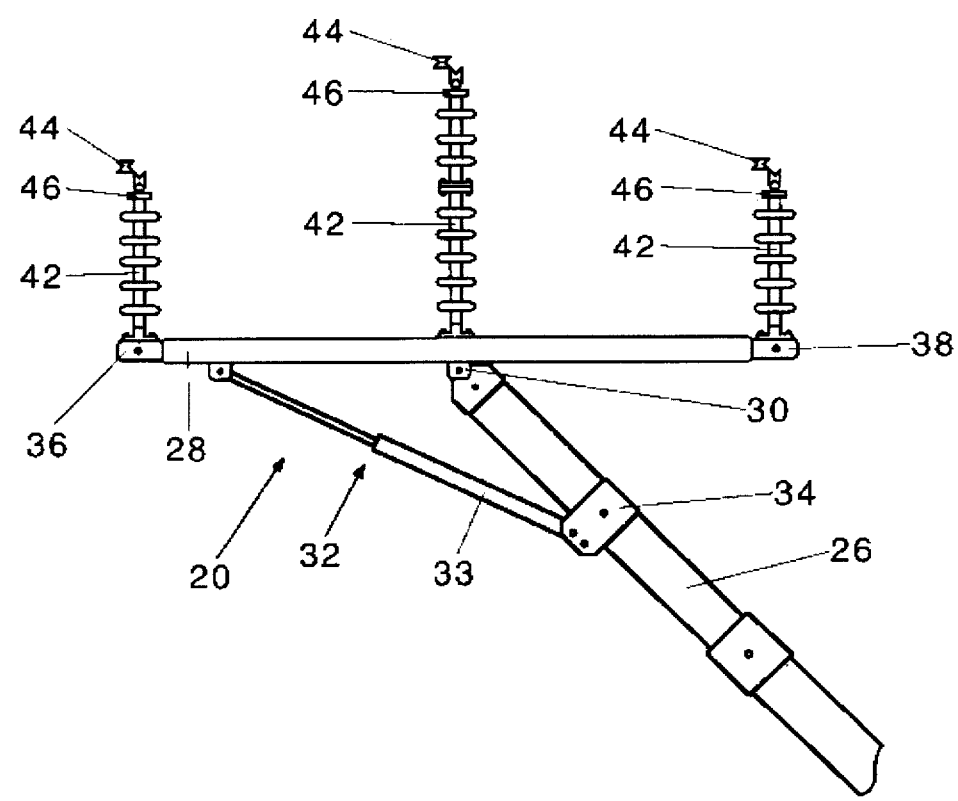
FIG. 4 is an alternative embodiment of the robotic arm of FIG. 3 wherein the boom adaptor is connected to a central portion of the upper frame.

An upper frame section 28, which preferably consists of an elongated tube, is connected to the end of boom adaptor 26 by means of a pivot joint 30. In a first embodiment of the invention illustrated in FIG. 3, boom adaptor 26 is connected to an end portion of upper frame 28. In an alternative embodiment shown in FIG. 4, boom adaptor 26 is connected to a central portion of upper frame 28.

Figure 5:
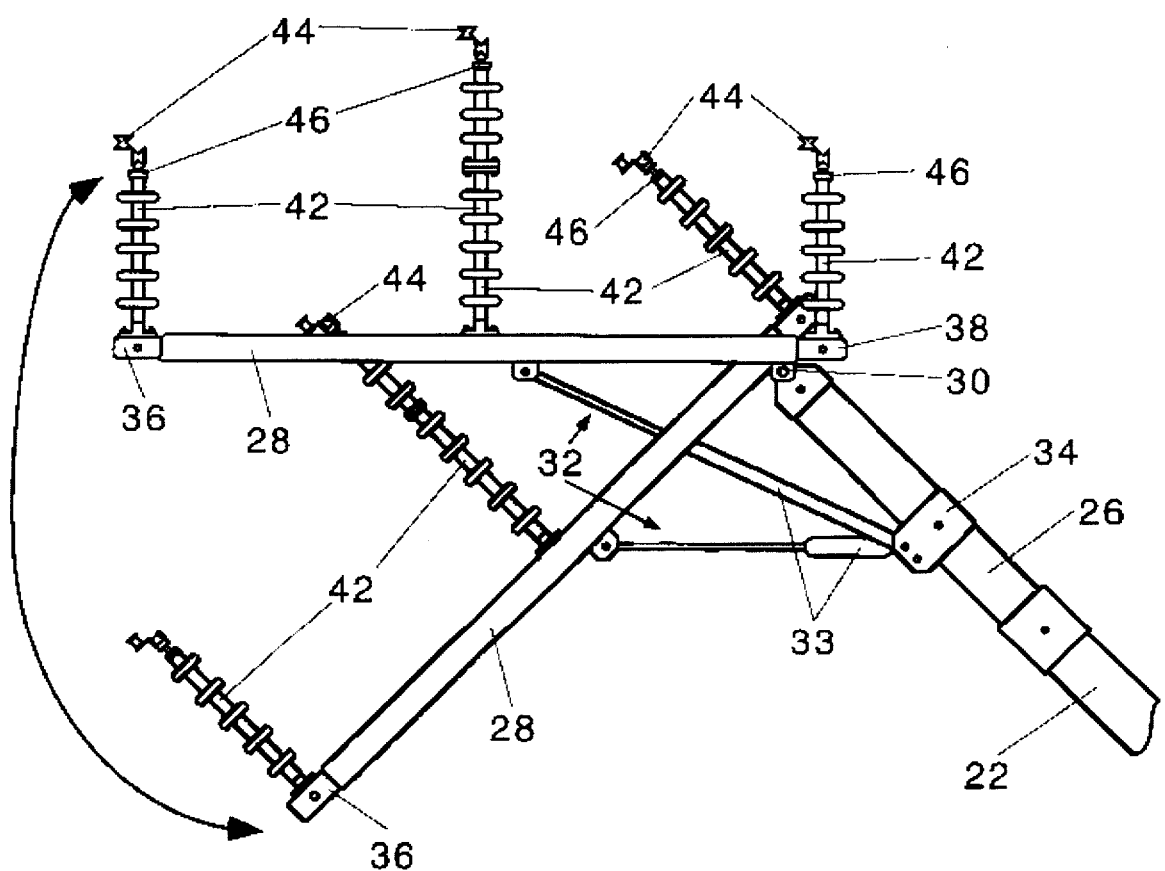
FIG. 5 is a side elevational view of the robotic arm of FIG. 3 illustrating the range of angular motion of the upper frame relative to the boom.
Figure 6:
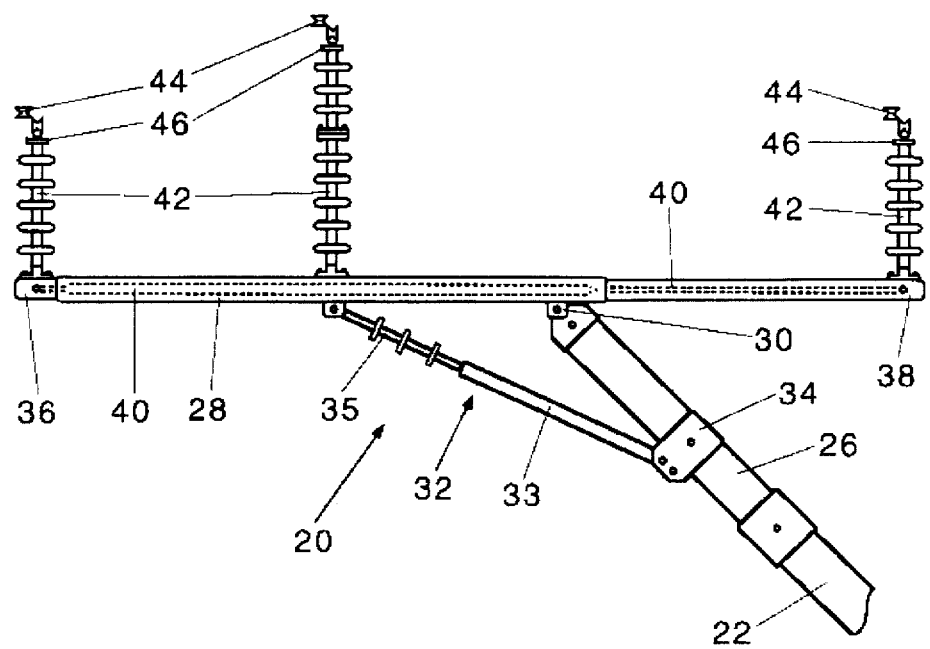
FIG. 6 is a side elevational view of the robotic arm of FIG. 3 with one telescoping arm retracted and the other telescoping arm extended.

"Adjustment means", namely an adjustable length levelling arm 32, extends between boom adaptor 26 and upper frame 28 for adjusting the angular position of frame 28 within approximately a 40 to 50 degree range of motion (FIG. 5). Extension and retraction of levelling arm 32 is actuated by a hydraulic cylinder 33. A polymer insulator 35 is also mounted on levelling arm 32. Levelling arm 32 is coupled to boom adaptor 26 by means of collar 34.

Figure 7:
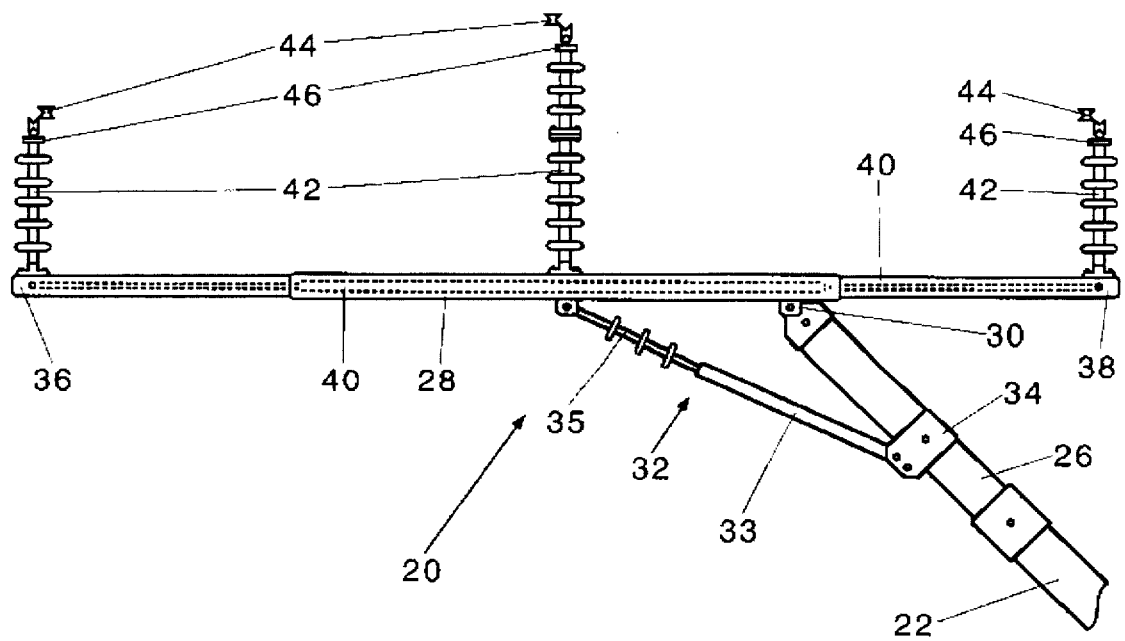
FIG. 7 is a side elevational view of the robotic arm of FIG. 3 with both telescoping arms extended.
Figure 8:
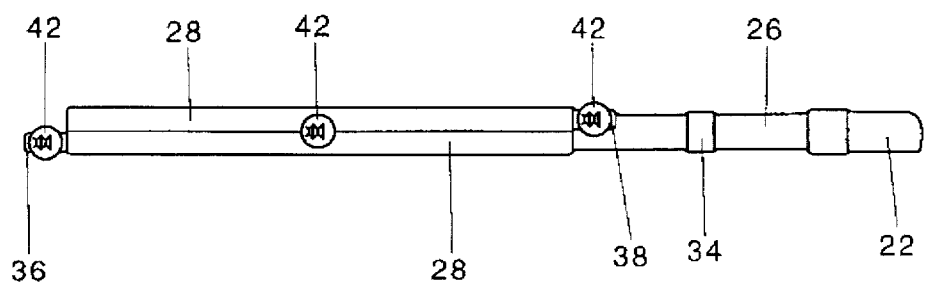
FIG. 8 is a top plan view of the robotic arm of FIG. 3.
Figure 9:
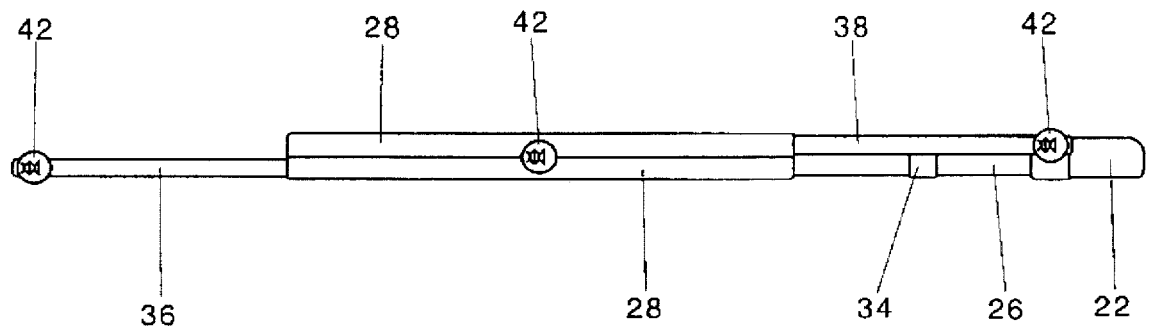
FIG. 9 is a top plan view of the robotic arm of FIG. 7.

Robotic arm 20 further includes first and second telescoping arms 36, 38 which are coupled to opposite ends of upper frame 28. As discussed further below, each telescoping arm 36, 38 is independently adjustable between a retracted position (FIG. 3) and an extended position coaxial with upper frame 28 (FIG. 7). Movement of telescoping arms 36, 38 is preferably actuated by hydraulic cylinders 40 housed within upper frame 28. Alternatively, threaded rods powered by hydraulic motors, worm gears, or other suitable mechanical actuators could be provided.

Robotic arm 20 also includes a series of insulators 42 mounted on the upper surface of upper frame 28 and telescoping arms 36, 38. A conductor holder 44 is mounted at the upper end of each insulator 42 for releasably coupling robotic arm 20 to a corresponding energized conductor 10. As should be apparent to someone skilled in the art, the number of insulators 42 and conductor holders 44 required would depend upon the number of transmission and/or distribution conductors in question. Further, the length of insulators 42, and the coupling together of more than one insulator 42, is determined by the mechanical arrangement of the conductors 10, 12 and the voltage level at which they are operating.

As discussed above, the centre conductor of a three phase transmission line often extends above the two outside conductors. Accordingly, the insulator stack 42 mounted on upper frame 28 may be longer in length than the insulators mounted on telescoping arms 36, 38 (FIG. 3), or consist of two insulators 42 bolted together. Insulators 35 and 42 preferably consist of station class polymer insulators which are rated for all weather use.

In an alternative embodiment of the invention (not shown) insulators 42 may be adjustable in length. For example, extension and retraction of the centre insulator stack 42 mounted on upper frame 28 could be controlled by a hydraulic cylinder. In another alternative embodiment, an insulator 42 could be pivotable relative to upper frame 28 or slidably adjustable along the longitudinal axis of frame 28.

A detailed view of the preferred form of conductor holder 44 is shown in its open configuration in FIGS. 10(a) and 10(b). Conductor holder 44 includes an upper sheave 56 and a matching lower sheave 58 which are hingedly coupled together. Lower sheave 58 is connected to a respective insulator 42 by means of a bearing adaptor 46. Bearing adaptor 46 allows free rotation of conductor holder 44. This allows conductor holder 44 to swivel for alignment with a conductor 10, 12 irrespective of the orientation of boom 22.

Bearing adaptor 46 includes a block 60 mounted on insulator 42. Block 60 comprises a bolt 62 for supporting a bearing 64 which can rotate freely relative to insulator 42.

When conductor holder 44 is pivoted to the closed position shown in FIGS. 10(c) and 10(d), a latch 66 on upper sheave 56 engages a corresponding locking tab 68 formed on lower sheave 58. Latch 66 has a ring 70 so that conductor holders 44 may be opened and closed by a lineman at a remote location using an insulated stick if conductors 10, 12 are energized. Of course, if conductors 10, 12 are deenergized, then conductor holders 44 can be opened and closed by hand.

In the closed position shown in FIG. 10(b), a conductor 10, 12 is captured within the aperture defined by upper and lower sheaves 56, 58.

Other commercially available conductor holders 44 may be used in conjunction with the invention. Suitable conductor holders 44 are manufactured by A. B. Chance Company of Centralia, Mo. and Hastings Fiber Glass Products Inc. of Hastings, Mich.

Figure 11:
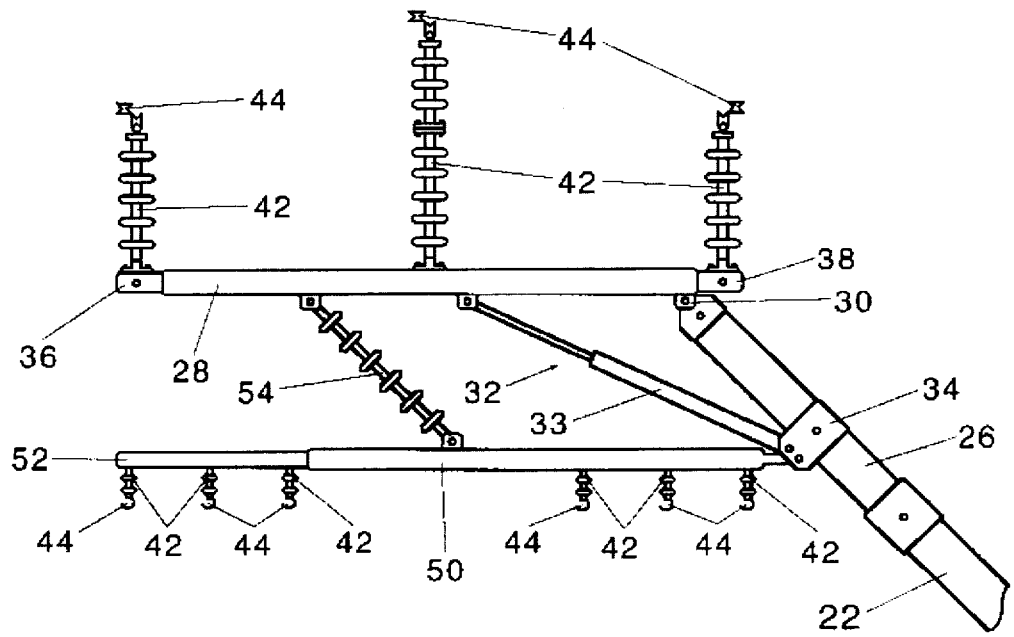
FIG. 11 is a side elevational view of an alternative embodiment of the invention having a lower frame for engaging distribution lines supported by a lower crossarm and showing the telescoping arms fully retracted.

As shown in FIG. 11, robotic arm 20 may also include a lower frame 50 which is pivotably connectable to collar 34 fitted on boom adaptor 26. Lower frame 50 extends generally parallel to upper frame 28 and is provided for engaging distribution lines 12 supported by a lower crossarm 18 directly beneath transmission lines 10 (FIG. 1). A telescoping arm 52 is connected to the free end of lower frame 50 and is extendible and retractable in the same manner as telescoping arms 36, 38. The lower frame 50 may either be a "slave" to the upper frame 28 or may be independently adjustable.

Figure 12:
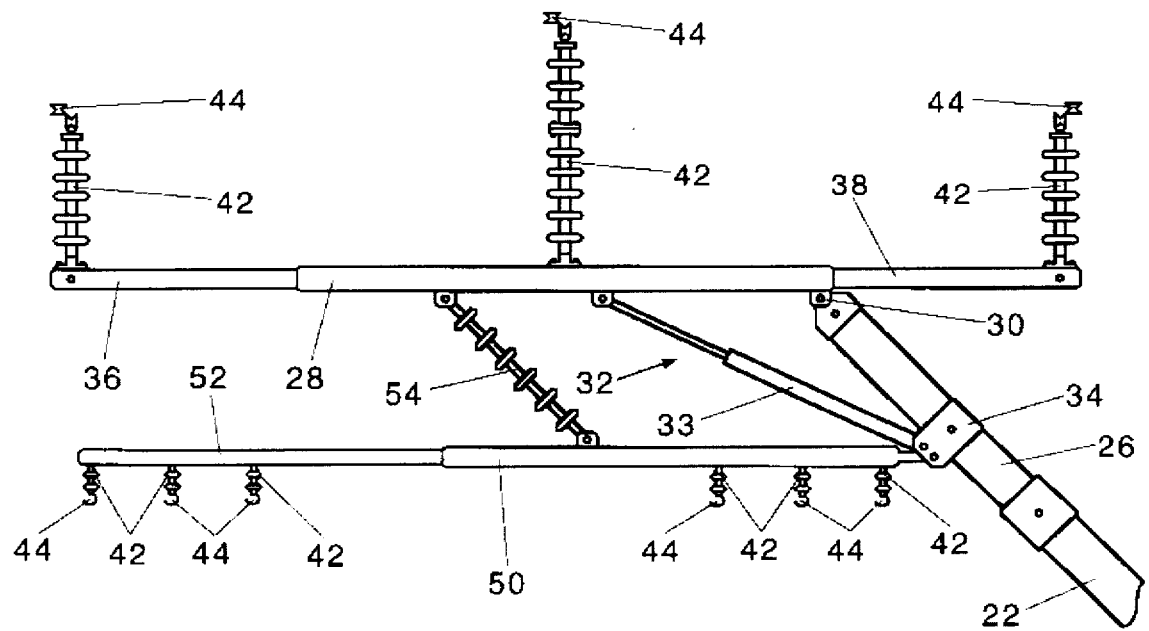
FIG. 12 is a side elevational view of the robotic arm of FIG. 11 with the telescoping arms fully extended.

Several spaced-apart insulators 42 are mounted on the undersurface of lower frame 50 and telescoping arm 52 and extend downwardly therefrom. Each insulator 42 is fitted with a conductor holder 44 for releasably engaging distribution lines 12. An insulated support 54 extends between upper frame 28 and lower frame 50 as shown in FIGS. 11 and 12.

Robotic arm 20 also includes "remote control means" for controlling the angular position of upper frame 28 and lower frame 50 and the position of telescoping arms 36, 38 and 52. The control system may consist of hydraulic hose (not shown) connected to the auxiliary port of the service vehicle hydraulic system and valving for controlling the operation of hydraulic cylinders 33 and 40.

Alternatively, the operation of hydraulic cylinders 33 and 40 could be remotely controlled by means of digital radio signals, fiber optic cables, or other suitable insulated control means. The remote operator could be positioned in a bucket secured to service vehicle boom 22, on transmission tower 14, on the deck of service vehicle 24, or on the ground.

Robotic arm 20 could be constructed from a nonconducting material such as KEVLAR™ or pultruded fiberglass rather than structural steel. This would lessen the overall weight of robotic arm 20 and would allow for the use of shorter insulator stacks 42 and a shorter insulated boom adaptor 26 (since the non-conductive material would contribute to the overall insulating capacity of arm 20). Shorter insulator stacks 42 are desirable to lessen the overall height of robotic arm 20 which is of particular importance when servicing transmission lines 10 with underbuild below. A shorter boom adaptor 26 is desirable so as to more easily keep within the weight bearing rating and capacity of the truck-mounted boom 22.

Robotic arm 20 should preferably have a lifting capacity of not less than 800 lbs per transmission line phase. Smaller, lighter robotic arms 20 with less lifting capacity would be suitable for servicing lower voltage distribution circuits (which often consist of lower weight conductors than transmissions circuits).

Figure 14:
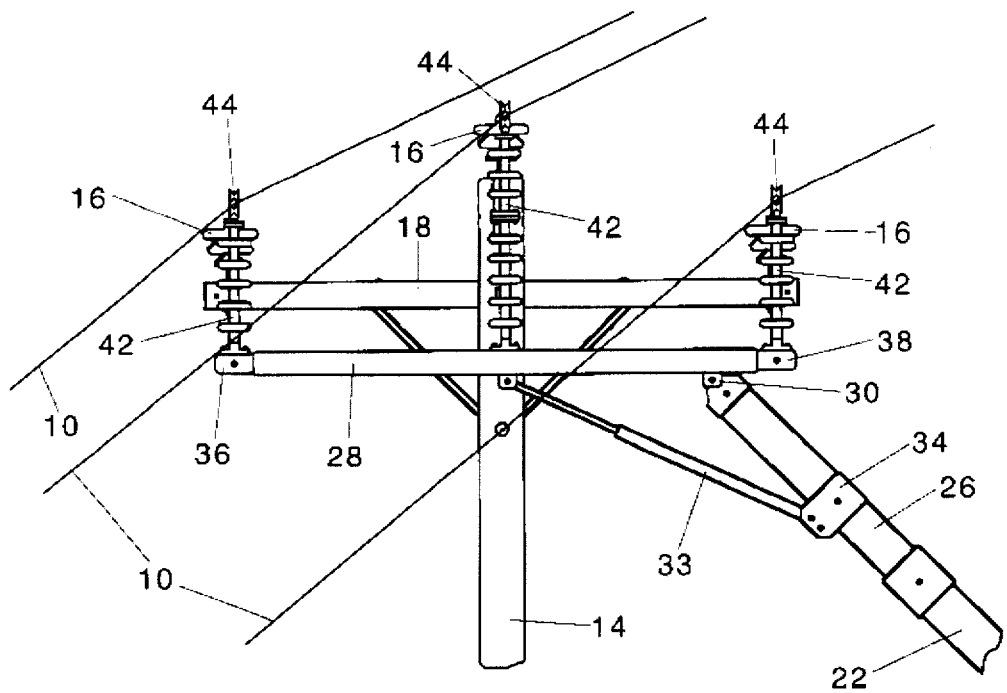
FIG. 14 is a side elevational view of the robotic arm of FIG. 3 with the telescoping arms fully retracted to releasably engage three spaced transmission conductors.

In operation, robotic arm 20 is first mounted on boom 22 of service vehicle 24 as described above. The hydraulic hoses (if any) are then connected to the auxiliary hydraulic port of service vehicle 24. Service vehicle 24 is typically parked immediately underneath or adjacent to the support tower 14 to be serviced. The truck boom 22 is extended to position arm 20 underneath the energized transmission lines 10 in question (FIG. 14). If necessary, boom 22 may be rotated about the turret 48 of service vehicle 24 (FIG. 2) until the desired angular position is reached.

Depending upon the angle of boom 22 it may be necessary to actuate hydraulic levelling cylinder 33 until the upper frame 28 of arm 20 rotates about pivot joint 30 to a position immediately underneath and parallel to crossarm 18. For example, if service vehicle 24 is parked a short distance away from the bottom of tower 14, then some adjustment will be necessary to ensure that upper frame 28 of arm 20 is level with crossarm 18, irrespective of the angle of truck boom 22. As shown in FIG. 14, in the level position, insulators 42 mounted on upper frame 28 and on telescoping arms 36, 38 are positioned immediately underneath corresponding transmission lines 10.

Figure 10:
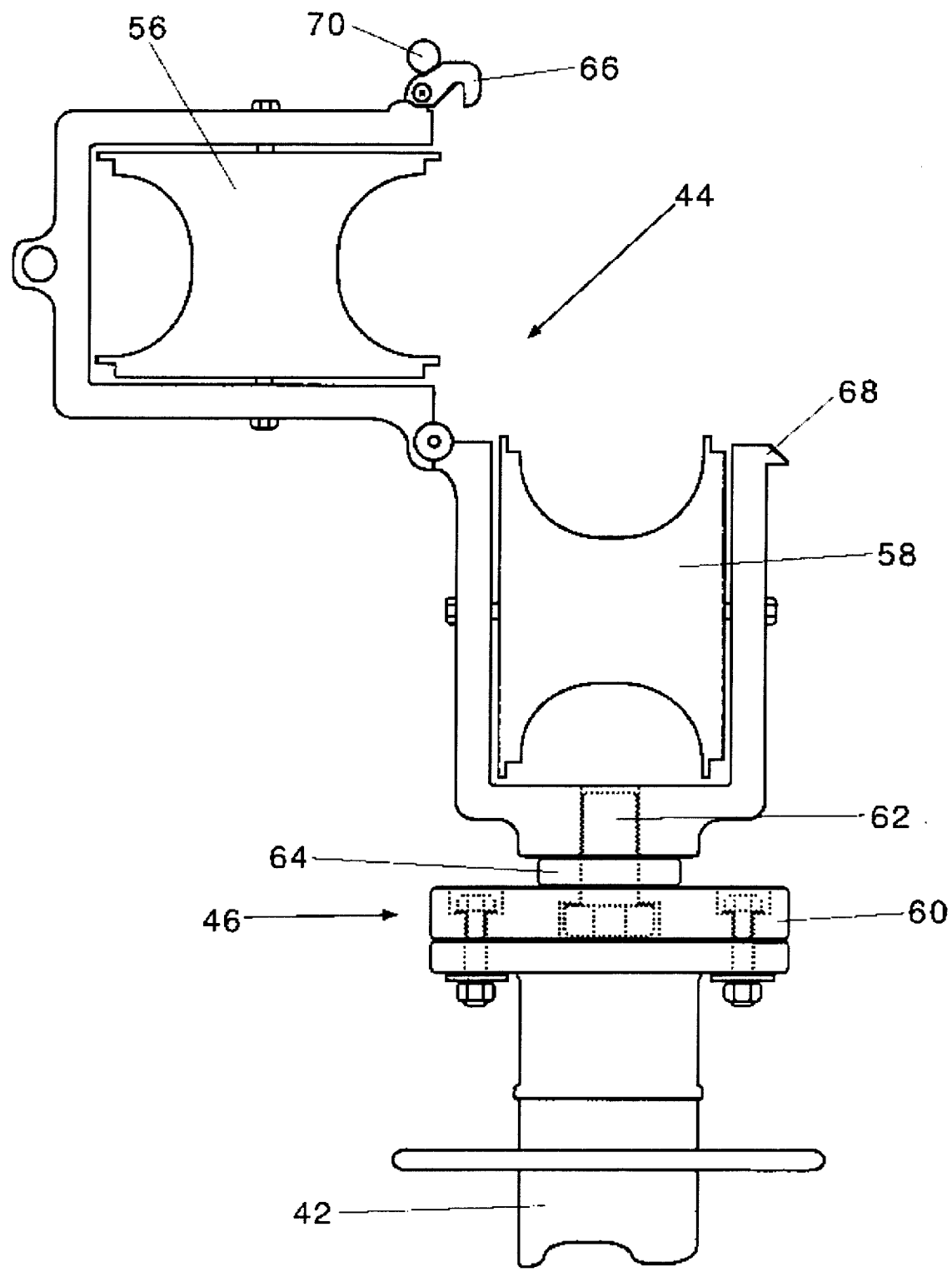
FIG. 10(a) is an enlarged side elevational view of a conductor holder in its open configuration and a bearing adaptor for rotatably coupling the conductor holder to a corresponding insulator.
FIG. 10(b) is a front elevational view of the conductor holder of FIG. 10(a).
FIG. 10(c) is a partially exploded, side elevational view of the conductor holder of FIG. 10(a) in its closed position.
FIG. 10(d) is a front elevational view of the conductor holder of FIG. 10(c) fully assembled.
Figure 10:
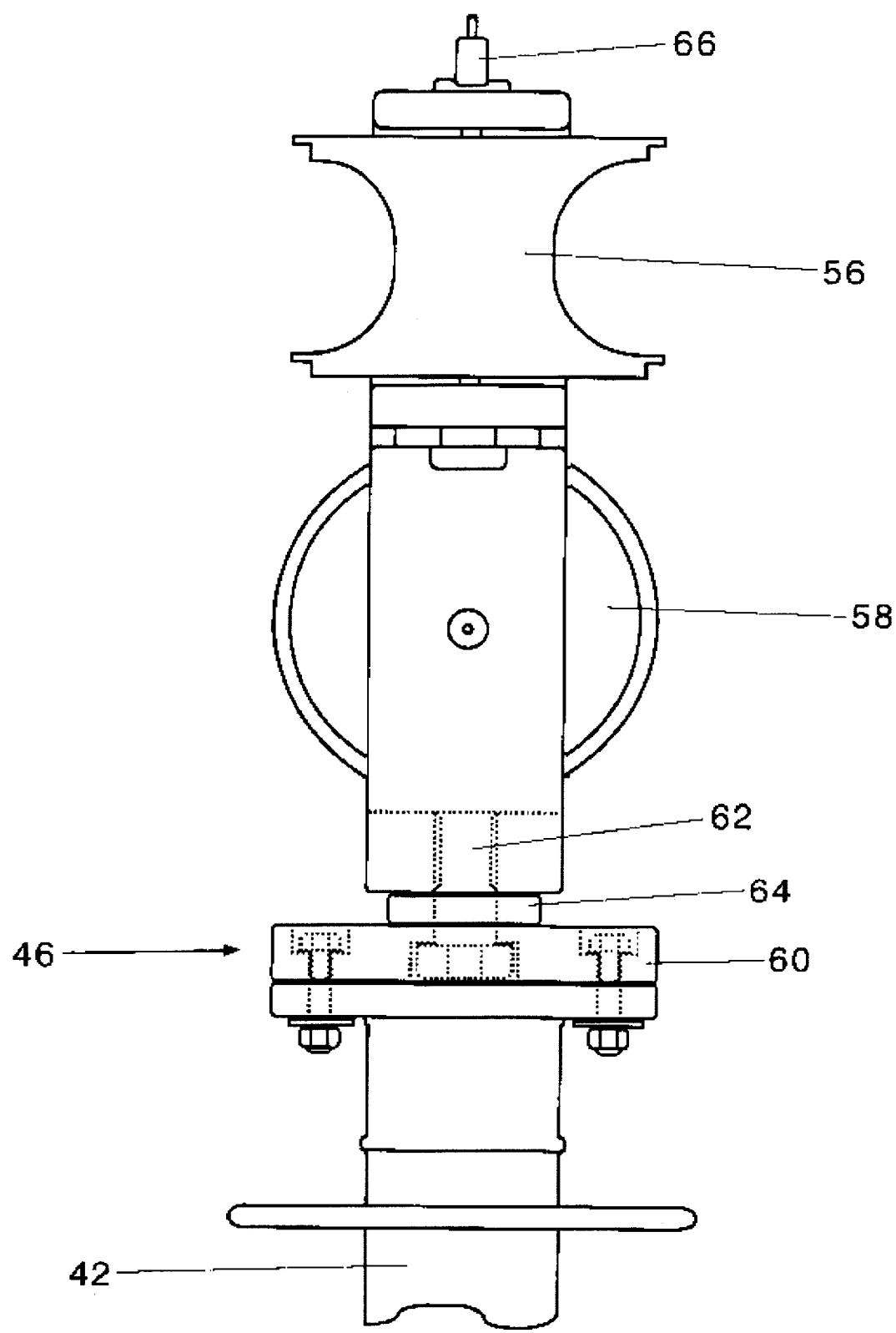
Figure 10:
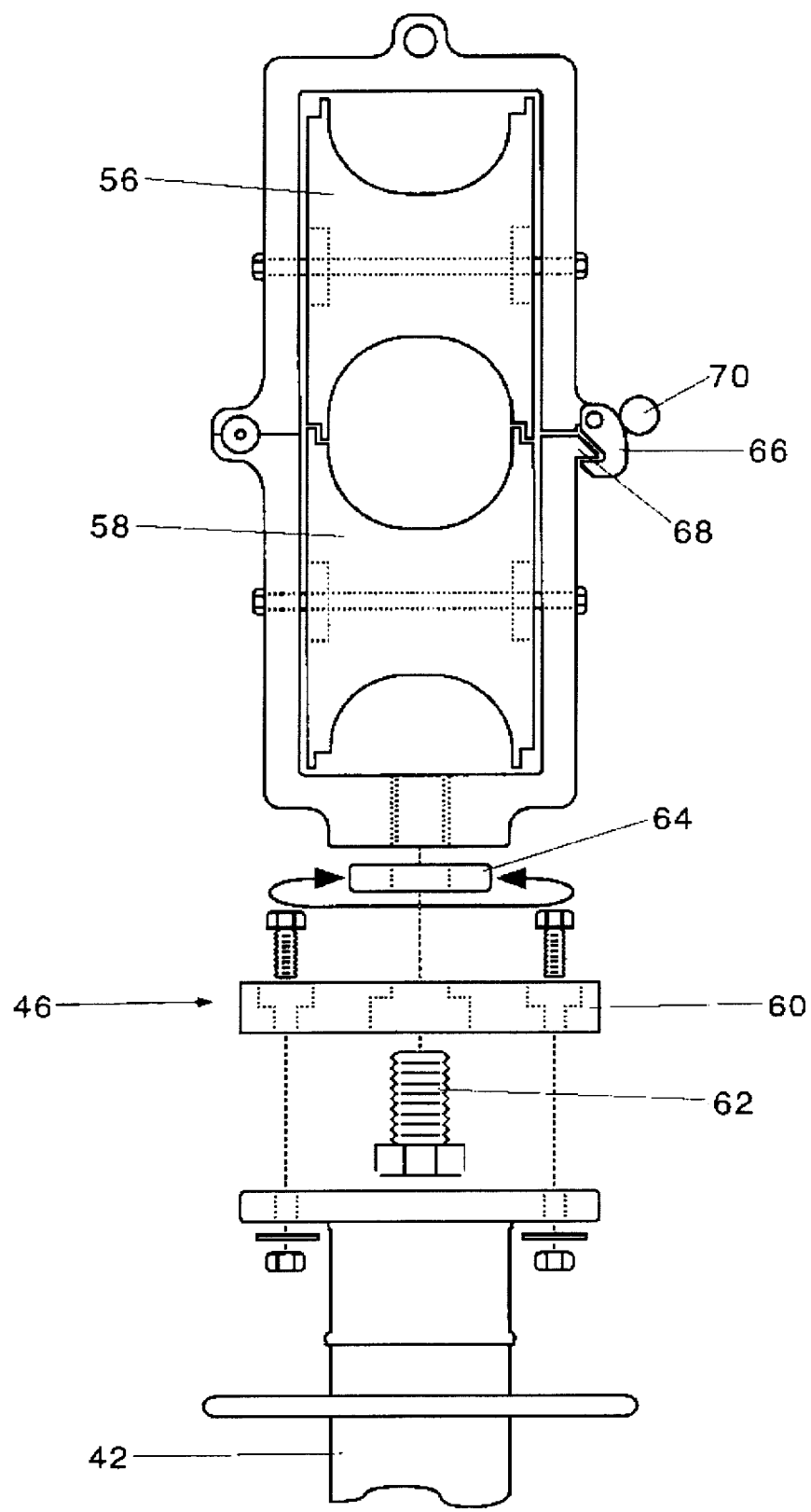
Figure 10:
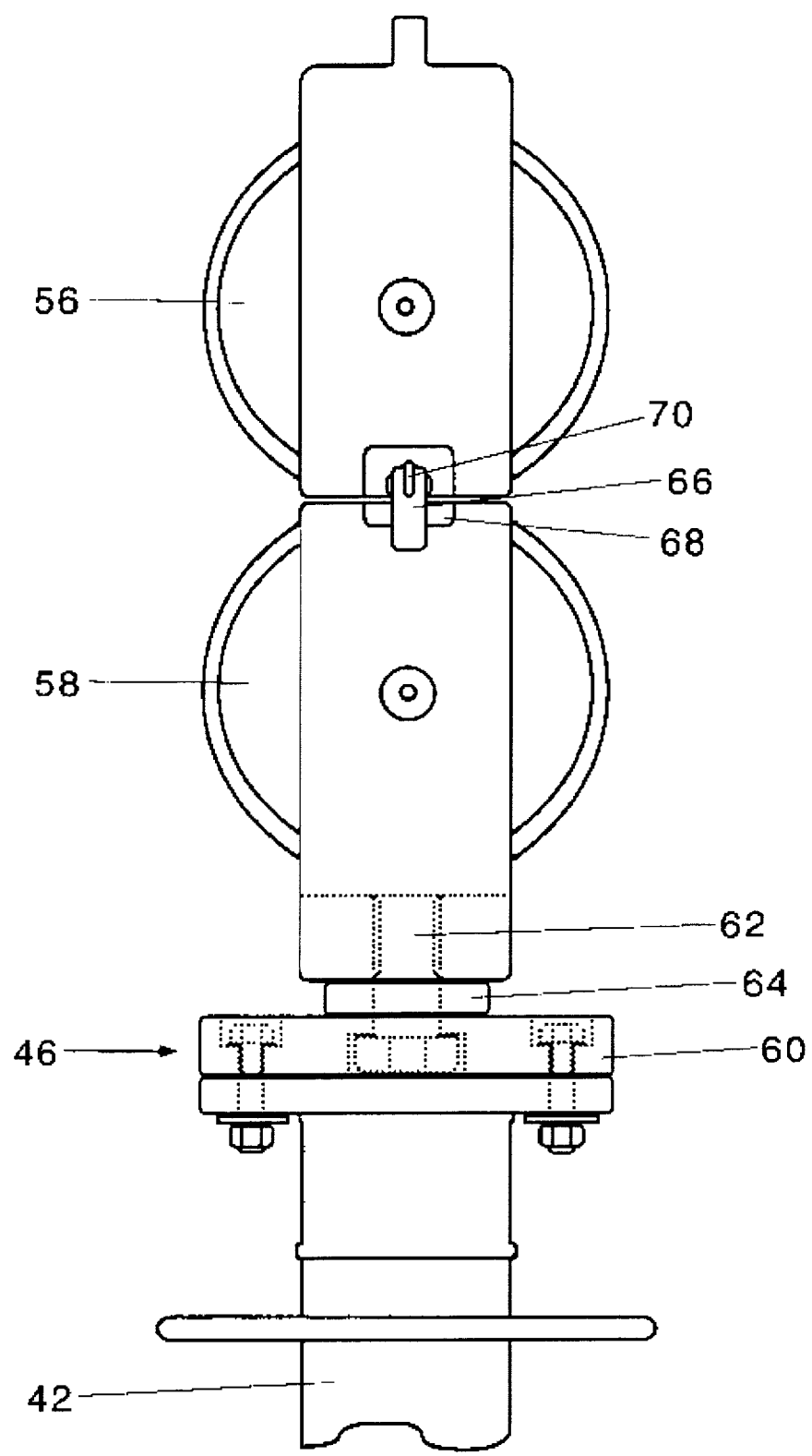

Once boom 22 has been extended to the position shown in FIG. 14, linemen working on tower 14 may then place each energized transmission line 10 into a corresponding conductor holder 44 mounted at the upper end of each insulator 42. Each conductor holder 44 is first positioned below a corresponding conductor 10. Conductor holders 44 are rotatable about bearing adaptor 46 for alignment with the corresponding conductor 10 irrespective of the orientation of boom 22 (FIG. 10). The conductor holder latching mechanism is then manually adjusted by the lineman from the open position shown in FIGS. 10(a) and 10(b) to the closed position shown in FIGS. 10(c) and 10(d). This is achieved by means of an insulated stick (not shown) with a hook attachment at one end which may be secured by the lineman to ring 70 of conductor holder 44. The insulated stick is thus used by the lineman to pivot the upper sheave 56 of the conductor holder 44 to the closed position as discussed above.

Figure 15:
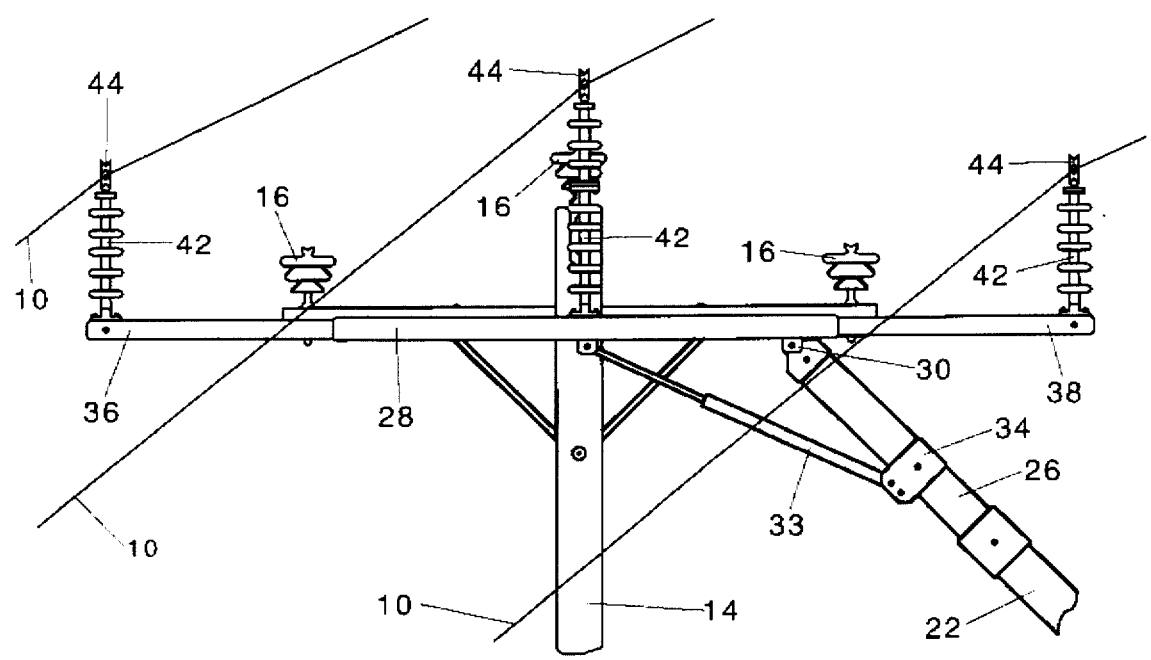
FIG. 15 is a side elevational view of the robotic arm of FIG. 14 with the telescoping arms extended to increase the spacing between the transmission conductors, and with the boom of the service vehicle extended to increase the elevation of the conductors.
Figure 16:
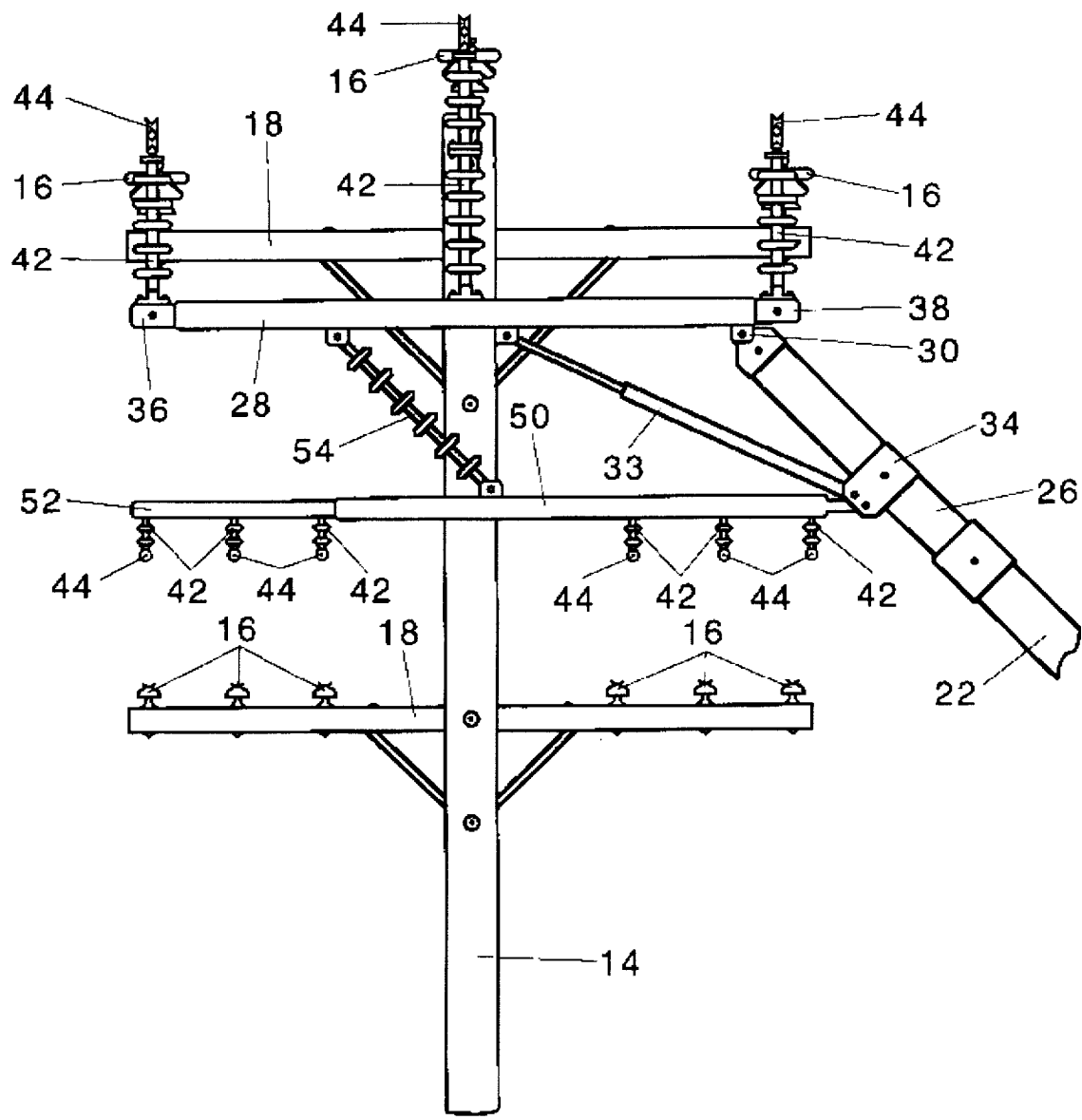
FIG. 16 is a side elevational view of the robotic arm of FIG. 11 with the telescoping arms fully retracted to releasably engage three spaced transmission conductors.
Figure 17:
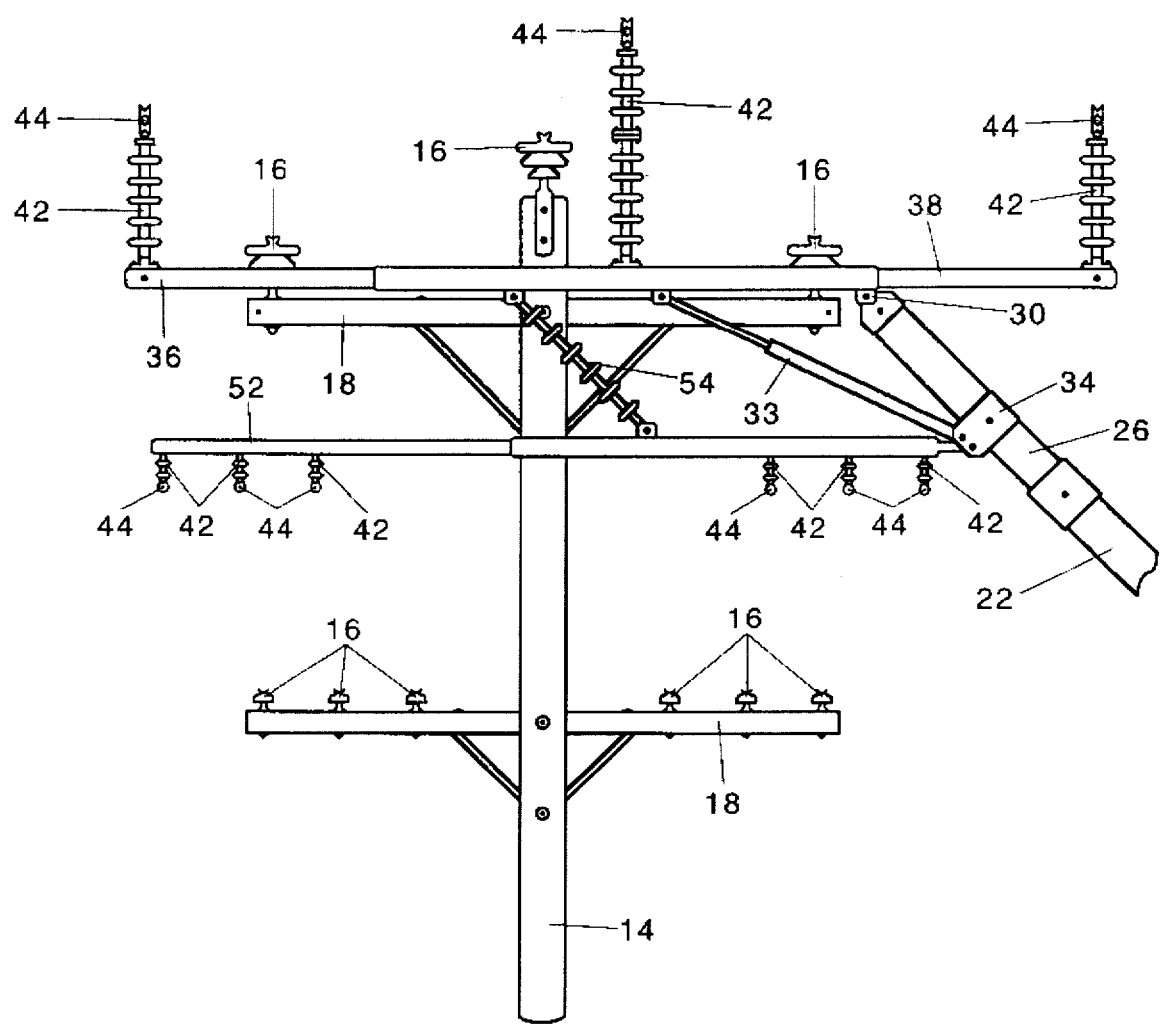
FIG. 17 is a side elevational view of the robotic arm of FIG. 16 with the telescoping arms extended.
Figure 18:
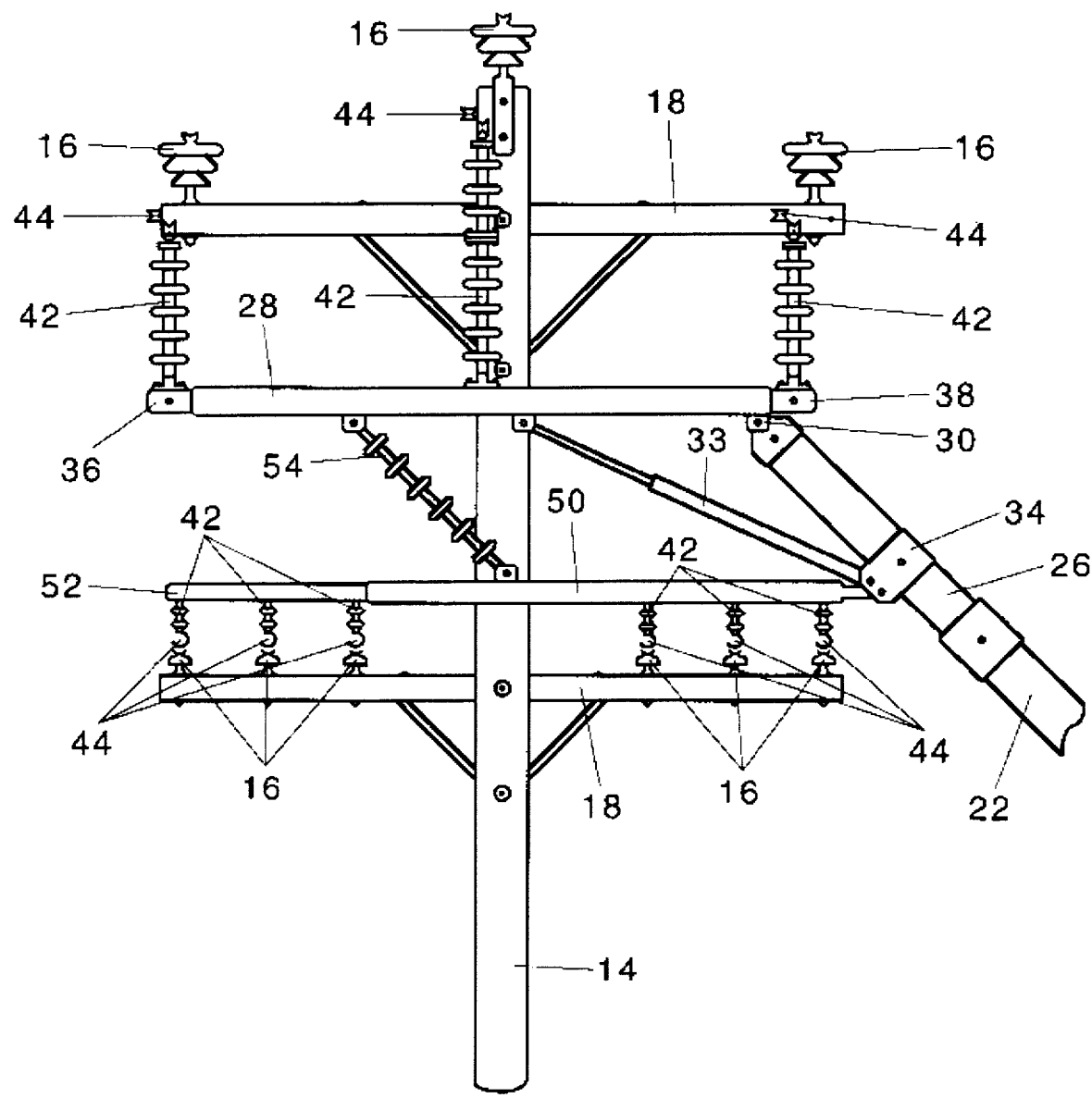
FIG. 18 is a side elevational view of the robotic arm of FIG. 11 positioned to engage distribution lines supported by a lower crossarm.

Once conductors 10 are securely captured within a corresponding conductor holder 44 as described above, the lineman manually unties conductors 10 from the insulator 16 mounted on the tower crossarm 18. Conductors 10 may then be raised well above tower 14 by extending boom 22. Additionally, the outside conductor strands 10 may be extended laterally away from tower 14 by extending telescoping arms 36, 38 as shown in FIG. 15. Extension of each telescoping arm 36, 38 is independently controllable by actuating hydraulic cylinders 40. The distance between phases may be extended from six feet to fourteen or fifteen feet to provide linemen with safe working clearances even in the case of high voltage lines (>100 kV).

Robotic arm 20 temporarily supports the weight of conductors 10 to enable servicing or replacement of conductor support structures, such as tower 14, insulator 16 or crossarm 18 by the linemen. After the required line maintenance has been completed, hydraulic cylinders 40 are actuated by the operator to retract telescoping arms 36, 38 and thereby return the outer conductor strands 10 to their original position. The truck boom 22 may then be lowered, if necessary, until upper frame 28 is positioned slightly below the level of crossarm 18. The conductors 10 are then retied by the linemen to the tower insulators 16 and the conducting holder latching mechanism is opened to complete the servicing procedure.

In some circumstances it is useful to adjust the angular position of robotic arm 20 during the conductor fastening procedure. For example, an outside conductor strand 10 could be connected to a corresponding conductor holder 44 mounted on a telescoping arm 36 or 38 while frame 28 is tilted at an angle (FIG. 5). Telescoping arm 36 or 38 could then be extended to move the conductor 10 a safe distance away from the tower 14 to be serviced. Robotic arm 20 could then be pivoted as described above until frame 28 is level with crossarm 18. The remaining conductor lines 10 could then be coupled to robotic arm 20, if necessary. This technique may be suitable, for example, if there is very little clearance between transmission tower 14 and surrounding structures. An important feature of the applicants' invention is the capacity to independently control the operation of levelling arm 32 and telescoping arms 36 and 38 to effectively achieve three degrees of movement of robotic arm 20 depending upon the sequence of motions selected.

As explained above, distribution lines 12 are often strung between support towers 14 a short distance below transmission lines 10. The embodiment of the invention illustrated in FIG. 11 is especially designed for supporting both transmission lines 10 and distribution lines 12 supported on a lower crossarm 18. In this embodiment, boom adaptor 26 is connected to an end portion of upper frame 28. This offset position ensures that boom 22 and boom adaptor 26 do not become hung up on distribution lines 12 when frame 28 is positioned immediately beneath transmission lines 10.

Figure 13:
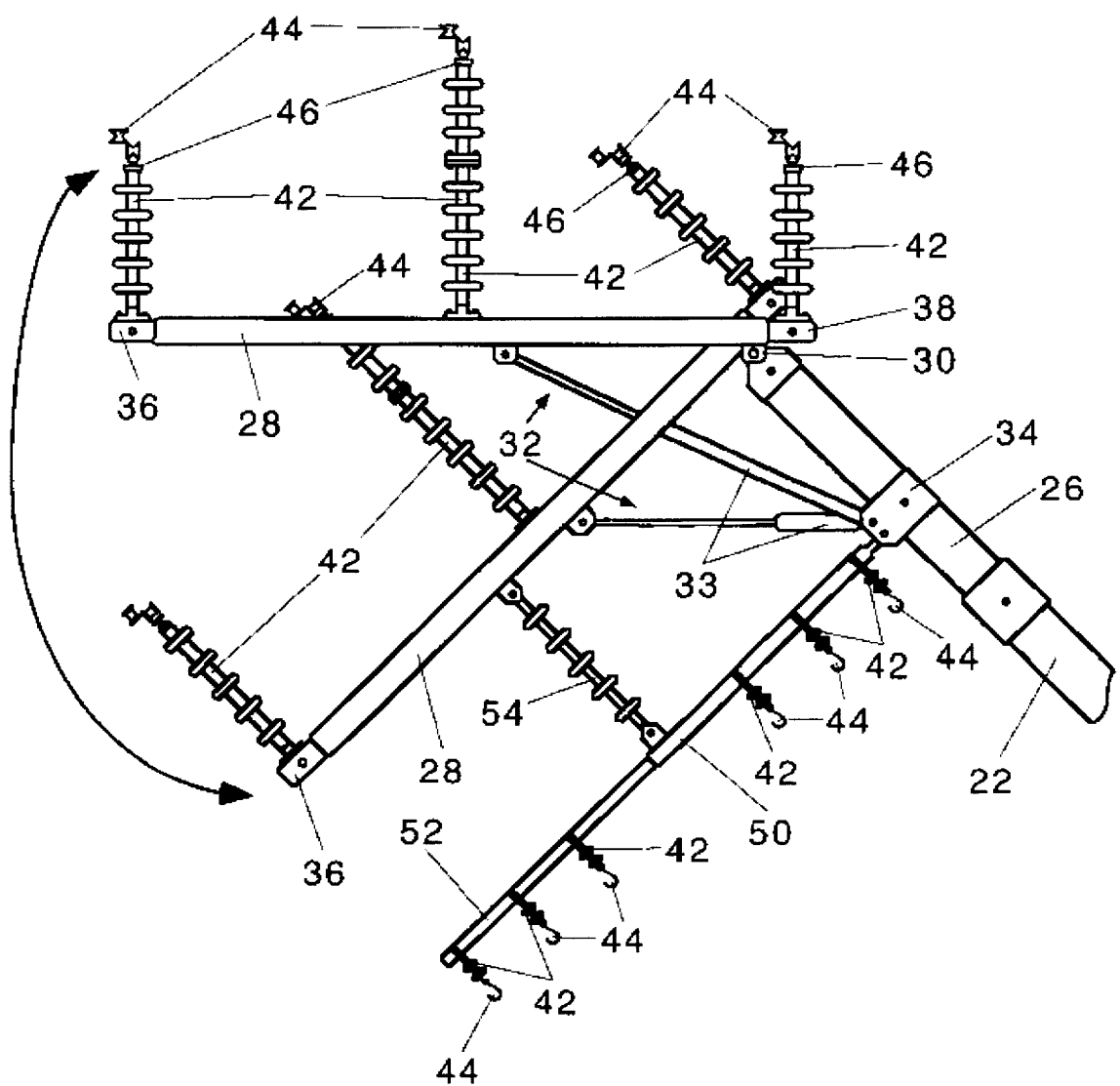
FIG. 13 is a side elevational view of the robotic arm of FIG. 11 illustrating the range of angular motion of the upper frame and lower frame relative to the boom.

Lower frame 50 extending below and generally parallel to upper frame 28 is provided for engaging distribution lines 12. As discussed above, a third telescoping arm 52 is slidably coupled to lower frame 50 for engaging distribution lines 12 and extending them laterally. Distribution lines 12 are coupled to lower frame 50 and telescoping arm 52 in the same manner as described above in connection with transmission lines 10. Lower frame 50 is pivotally coupled to boom adaptor collar 34 and hence the angular position of lower frame 50 may be adjusted as levelling arm 32 is extended or retracted (FIG. 13).

The combination of upper frame 28 and lower frame 50 enables robotic arm 20 to temporarily support both an upper set of transmission lines and a lower set of distribution lines fastened to one tower 14. This allows one service vehicle 24 fitted with robotic arm 20 to perform tower replacements or repairs. Additionally, in the event that a new crossarm 18 is required for supporting transmission lines 10, the new crossarm 18 may be temporarily secured to robotic arm 20 and raised into position by extending truck boom 22. This procedure represents a considerable saving in time and an improvement in safety over previous methods which involve carefully raising the new crossarm between energized distribution lines 12. Crossarms 18 are relatively heavy (60--100 lbs) and are therefore difficult for one lineman to handle.

Robotic arm 20 could also find application in providing temporary mid-span support for energized conductors 10, 12 in addition to transmission tower servicing.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A boom-mountable robotic arm for temporarily supporting a conductor, comprising:

(a) a boom adaptor connectable to the boom of a service vehicle;

(b) an upper frame pivotably connected to said boom adaptor;

(c) a first telescoping arm coupled to a first end of said upper frame and movable relative to said upper frame between retracted and extended positions;

(d) a first insulator mounted on said telescoping arm;

(e) a conductor holder mounted on said first insulator for releasably coupling said robotic arm to said conductor; and (f) adjustment means for adjusting the angular position of said upper frame relative to said boom adaptor.

2. The robotic arm as defined in claim 1, further comprising actuating means for actuating movement of said first telescoping arm.

3. The robotic arm as defined in claim 2, further comprising remote control means for remotely controlling operation of said actuating means.

4. The robotic arm as defined in claim 3, wherein said actuating means comprises a first hydraulic cylinder housed within said upper frame.

5. The robotic arm of claim 3, wherein said upper frame and said first telescoping arm are coaxial.

6. The robotic arm as defined in claim 3, wherein said adjustment means comprises an extensible adjustment arm extending between said upper frame and said boom adaptor.

7. The robotic arm as defined in claim 6, wherein said adjustment means further comprises a hydraulic levelling cylinder mounted on said adjustment arm for actuating movement of said adjustment arm.

8. The robotic arm as defined in claim 7, wherein operation of said first hydraulic cylinder and said levelling cylinder are independently controllable by said remote control means.

9. The robotic arm as defined in claim 3, wherein said boom adaptor is connected to an end portion of said upper frame.

10. The robotic arm as defined in claim 3, wherein said boom adaptor is connected to a central portion of said upper frame.

11. The robotic arm as defined in claim 3, further comprising a second telescoping arm coupled to a second end of said upper frame and movable relative to said upper frame between retracted and extended positions.

12. The robotic arm as defined in claim 10, further comprising a second insulator mounted on said second telescoping arm for temporarily supporting a second conductor.

13. The robotic arm as defined in claim 12, further comprising a second conductor holder mounted on said second insulator for releasably connecting said robotic arm to said second conductor.

14. The robotic arm as defined in claim 13, further comprising a third insulator mounted on said upper frame for temporarily supporting a third conductor.

15. The robotic arm as defined in claim 14, further comprising a third conductor holder mounted on said third insulator for releasably connecting said robotic arm to said third conductor.

16. The robotic arm as defined in claim 15, wherein said third insulator is longer in length than said first and second insulators.

17. The robotic arm as defined in claim 15, wherein said first, second and third conductor holders are rotatably coupled to said first, second and third insulators respectively.

18. The robotic arm as defined in claim 11, wherein said actuating means further comprises a second hydraulic cylinder housed within said upper frame for actuating movement of said second telescoping arm between said retracted and extended positions.

19. The robotic arm as defined in claim 11, wherein first and second telescoping arms are slidably coupled to said upper frame.

20. The robotic arm as defined in claim 11, wherein said first and second telescoping arms are rotatably coupled to said upper frame.

21. The robotic arm as defined in claim 11, wherein said upper frame and said first and second telescoping arms are coaxial.

22. The robotic arm as defined in claim 1, wherein said boom adaptor is constructed from an insulating material.

23. The robotic arm as defined in claim 11, wherein said upper frame and said first and second telescoping arms are constructed from insulating material.

24. The robotic arm as defined in claim 13, further comprising a lower frame extending beneath and parallel to said upper frame, wherein said lower frame is pivotally coupled to said boom adaptor.

25. The robotic arm as defined in claim 24, further comprising a third telescoping arm coupled to one end of said lower frame and movable relative to said lower frame between retracted and extended positions.

26. The robotic arm as defined in claim 24, wherein said actuating means further comprises a third hydraulic cylinder for actuating movement of said third telescoping arm.

27. The robotic arm as defined in claim 25, further comprising a fourth insulator mounted on said third telescoping arm for supporting a fourth conductor extending below said lower frame.

28. The robotic arm as defined in claim 24, wherein said adjustment means adjusts the angular position of said lower frame relative to said boom adaptor.

29. The robotic arm as defined in claim 28, further comprising an insulated support extending between said upper and lower frames for maintaining said frames in spaced parallel relation.

30. The robotic arm as defined in claim 26, wherein the operation of said boom, said first, second and third hydraulic cylinders, and said levelling cylinder are independently controllable by said remote control means.

31. The robotic arm of claim 1, wherein said conductor holder comprises a first housing and a second housing which are hingedly coupled together, wherein said holder is adjustable between an open position permitting placement of said conductor in said holder and a closed position wherein said conductor is captured within said holder.

32. The robotic arm of claim 31, wherein said conductor holder further comprises latching means for latchingly coupling said first and second housings together in said closed position.

33. The robotic arm of claim 32, further comprising first and second sheaves rotatably mounted within respective first and second housings, wherein said conductor is captured between said first and second sheaves in said closed position.

34. The robotic arm of claim 33, wherein said first and second sheaves are generally concavo-concave in shape and together define a generally circular aperture for receiving said conductor in said closed position.

35. The robotic arm of claim 1, wherein said conductor holder is rotatably coupled to said first insulator.

* * * * *